United States Patent
Carel et al.

(10) Patent No.: US 7,964,240 B2
(45) Date of Patent: Jun. 21, 2011

(54) PRODUCING COATED GRAPHITIC ANODE POWDERS BY EXTRACTING PITCH FROM HIGH VOLATILE MATTER COKE AND COATING THE SAME IN-SITU

(75) Inventors: Mark W. Carel, Ponca City, OK (US); Edward J. Nanni, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 307 days.

(21) Appl. No.: 12/355,888

(22) Filed: Jan. 19, 2009

(65) Prior Publication Data
US 2010/0183801 A1 Jul. 22, 2010

(51) Int. Cl.
*B05D 3/02* (2006.01)
(52) U.S. Cl. ....................... 427/228; 427/226
(58) Field of Classification Search .............. 427/226, 427/228
See application file for complete search history.

(56) References Cited

U.S. PATENT DOCUMENTS

| | | | |
|---|---|---|---|
| 1,822,349 A | 9/1931 | Jannek | |
| 2,603,592 A | 7/1952 | Nelson | |
| 3,382,084 A | 5/1968 | Folkins | |
| 4,369,171 A * | 1/1983 | Grindstaff et al. | 423/461 |
| 5,932,186 A * | 8/1999 | Romine et al. | 423/447.2 |
| 7,323,120 B2 | 1/2008 | Mao | |
| 2005/0136330 A1* | 6/2005 | Mao et al. | 429/231.95 |
| 2005/0247914 A1* | 11/2005 | Mao et al. | 252/500 |

\* cited by examiner

*Primary Examiner* — Michael Cleveland
*Assistant Examiner* — Robert Vetere

(57) ABSTRACT

This invention relates to a process for making carbon coated graphitic anode powders for use in batteries including rechargeable lithium-ion batteries wherein the process includes a side product isotropic pitch for use as a precursor in other products and more preferably, as a coating material for other powder or particle products. The process includes the steps of solvent extraction of volatile materials from high volatile material green coke powder. When a desirable amount of the volatile materials have been extracted, the solvent strength is altered to cause some of the volatile materials to precipitate on the powder particles to coat the same. The coated and solvent-extracted particles are then separated from the solvent and oxidatively stabilized, then carbonized and preferably graphitized. The volatile materials remaining in the solvent are valuable and are recovered for use in other processes and other products.

5 Claims, 4 Drawing Sheets

PRODUCING COATED GRAPHITIC ANODE POWDERS BY EXTRACTING PITCH FROM HIGH VOLATILE MATTER COKE AND COATING THE SAME IN-SITU

CROSS-REFERENCE TO RELATED APPLICATIONS

None.

STATEMENT REGARDING FEDERALLY SPONSORED RESEARCH OR DEVELOPMENT

None

FIELD OF THE INVENTION

This invention relates to materials for use in the negative electrode of lithium-ion batteries and processes for making such materials.

BACKGROUND OF THE INVENTION

Rechargeable lithium-ion battery technology is an attractive technology for broader adoption in portable power systems because of its light weight, high voltage, high electrochemical equivalence and good conductivity. With the prospect of broad use of battery power in automotive propulsion systems, whether hybrid or plug-in or other technology, many efforts have been undertaken to improve lithium-ion batteries to meet the expected market needs and to capture as much of the substantial reward and value that will likely come from broad implementation. One development that is likely to be adopted in commercial lithium-ion batteries is carbon coated graphitic powders for use on the anode or negative electrode of lithium-ion batteries. The graphite provides efficient intercalation and de-intercalation of lithium ions while the carbon coating enhances electrical conductivity and protection for the underlying graphite from the electrolyte in a battery. High first cycle efficiency and long cycle life are better enabled with such materials in the anode.

However, as with almost anything, improved performance or improved characteristics such as lighter weight are always desirable and there is always a drive toward providing high performance at lower cost. With the current process of making carbon coated graphitic particles, the starting material is obtained from petroleum coke. The coke may be calcined prior to coating or may be calcined after it is coated. The coating is applied by a selective precipitation method where carbon residue forming materials, preferably a high molecular weight petroleum pitch, is dissolved in a solvent. The coke particles are added to the pitch solution and the solvent strength is altered by the addition of more solvent or other liquids to cause the higher molecular weight species in the pitch to precipitate on the particles. The coated coke particles are then removed from the coating process and stabilized at an elevated temperature in the presence of oxygen, and graphitized in an inert environment at a temperature higher than the stabilization temperature. This process is generally described in commonly own U.S. Pat. No. 7,323,120 issued Jan. 29, 2008.

It is highly desirable to make really small particle size graphitic materials and be able to tailor the particle size distribution so that a predetermined range of particle sizes with a predetermined average or mean could be delivered to a battery manufacturer per the manufacturer's specifications. To be able to produce such materials with low cost precursors in a fast and inexpensive process would be even more ideal.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
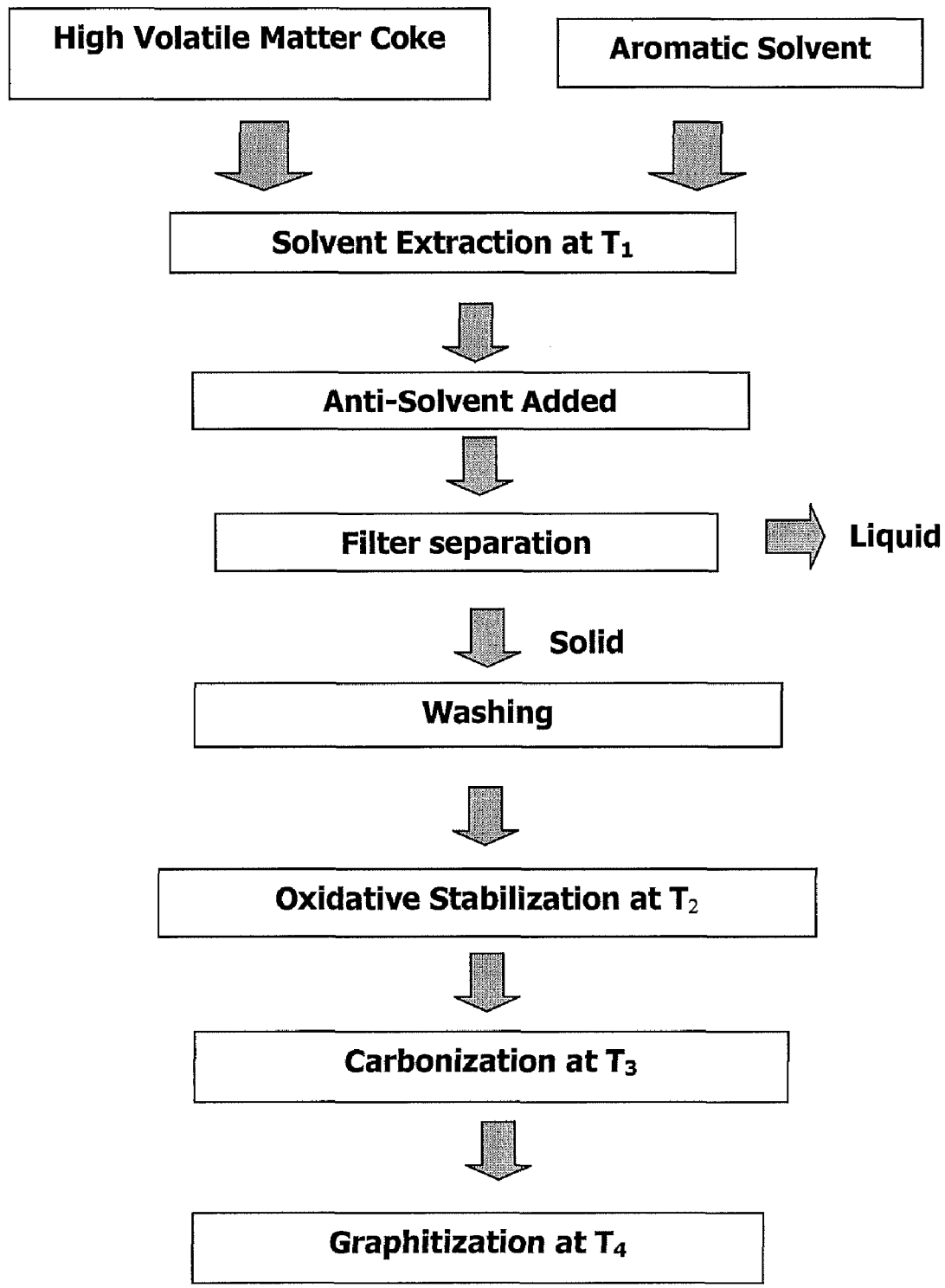
FIG. 1 is process flow chart setting forth the basic steps of the present invention.

The description, discussion and understanding of the invention, as it relates to various parameters and qualities for batteries, will be aided by setting forth several definitions. As used herein, the terms are intended to have their usual meanings in the art but for clarity, the specific definitions are provided to avoid confusion and aid in clear understanding.

A "cell" is the basic electrochemical unit used to store and release electrical energy.

A "battery" is two or more electrochemical cells electrically interconnected in an appropriate series/parallel arrangement to provide the required operating voltage and current levels. Under common usage, the term "battery" is also applied to a single cell device.

The "anode" is the negative electrode of a cell.

The "cathode" is the positive electrode of a cell.

"Specific Capacity" is the electric energy available in a charged cell per unit weight and is given in the units of mAh/g or mAh/cc.

"Coulombic Efficiency (%)" is the ratio of the amount of electrical charge discharged from an electrode material to the amount of electrical charge used to charge the electrode to the state before discharge.

"Electrode Potential" is the electrical voltage between the electrode of interest and another electrode (reference electrode).

"Power" means energy released per unit time

"Stabilization" is a process which renders particles of a carbon-residue-forming material (CRFM) infusible such that the surface of the CRFM particles does not soften or melt and fuse to adjacent CRFM particles during subsequent heat treatments as long as the temperature of the subsequent heat treatment does not exceed the instantaneous melting point of the stabilized CRFM.

"Carbonization" is a thermal process that converts a carbon containing compound to a material that is characterized as being "substantially carbon". "Substantially carbon", as used herein, indicates that the material is at least 95% carbon by weight.

"Graphitization" is a thermal process that converts a carbon containing compound to a material that is characterized as being at least 99% carbon by weight including the formation of graphene sheets and the ordering or stacking of the sheets on top of each other.

A "carbon-residue-forming material" (CRFM) is any material which, when thermally decomposed in an inert atmosphere to a carbonization temperature of 600° C. or an even greater temperature up to about 1600° C., forms a residue which is "substantially carbon". Pitch is a carbon-residue-forming material.

With the foregoing understood, the present invention relates to a process for producing carbon coated graphitic powders for use in the anode of batteries and especially in the anode of rechargeable lithium-ion batteries. The process particularly includes an in-situ process for coating green coke having high volatile matter therein. A volatile matter content of between about 10% and 30% is considered to be high. The volatile matter is comparable to pitch and is a carbon-residue-forming material. At least a portion of the volatile matter in the green coke is extracted and used to the coat the particles. Part of the invention is to recover the volatile matter from the green coke other than what remains as the coating on other particles so that it may be used to make other materials that are used in batteries and in other technologies.

As seen in FIG. 1, the process basically begins with mixing milled green cokes having a volatile matter content of 10-30% with an aromatic solvent, such as benzene, toluene or xylene, in a solvent-to-coke ratio of 0.5:1-5:1 at a temperature above 50° C. and more preferably above 200° C., and at pressures of ambient or above. After at least a portion of the volatile materials has been extracted from the green coke by the solvent, an anti-solvent is added to the suspension to cause volatile material to precipitate. The coke particles serve as nucleation sites for precipitating the volatile material and therefore the volatile material is distributed on the surface to coat the particles.

Typically, the solvent treatment/extraction is carried out in a closed vessel or autoclave. The solvent suspension at elevated temperature may autogenously create pressures up to 200 psi in the closed vessel, depending upon the solvent and the temperature. The processing conditions of the green coke at the refinery at which the coke is created determines the available molecular weight range of the soluble pitch and oils. The amount and type of solvent used to extract the volatile matter is selected to adjust the molecular weight range of the extracted oils. The amount and type of anti-solvent used to cause the precipitation of the volatile matter on the particles determines the thickness and softening point of the coating.

The next step of the process is to remove the now solvent-treated and coated green coke from the solvent. This is done preferably by filtering, but any other suitable process for separating particle solids from liquid may be satisfactory. Other potential technologies possibly include centrifugal separation, decanting and evaporative separation. The solvent-treated green coke is preferably washed with a low solvent strength solvent, such as a mixture of solvent with anti-solvent, to remove undesirable soluble oils that might remain. The solvent-treated green coke particles are then dried in air or other moderate conditions to eliminate solvent from the coating. The higher carbon number hydrocarbons typically precipitate first from the volatile components and are substantially insoluble at atmospheric conditions without solvent.

The coating is preferably further processed by stabilization in the presence of oxygen at elevated temperature. As the temperature of the stabilization treatment is increased, typically at about 1° C. per minute starting at about room temperature up to about 350° C. which is maintained approximately two hours, the pitch coating oxidizes and becomes infusible while the temperature increases. If the temperature were to be ramped up too fast or the oxidation were not to adequately proceed in conjunction with the increase in temperature, the pitch coating would become sticky and the particles would likely fuse together. Fusing of the particles is undesirable for several reasons: 1) it results in product with an uncontrolled distribution of particles and a fractions of particles that are larger than desired, 2) particles larger than desired makes processing the particles into a battery difficult, and 3) milling of the fused particles to separate individual particles are likely to create jagged surfaces that are high in surface area and that could catalyze decomposition of electrolyte used in a battery. More importantly, electrolyte decomposition degrades the performance of a battery. As electrolyte decomposition is very undesirable, graphite anode materials with smooth surfaces, rounded shapes, and low surfaces areas are desirable. Thus, controlled ramping of the temperature so that the oxidative stabilization proceeds properly is preferred.

Once the particles are stabilized at a temperature of about 325° C. to 350° C., the particles are carbonized in an inert environment at temperatures from 600° C. to 1600° C. During this process the non-carbon constituents in the coating and the underlying coke particles is reduced to the point where carbon comprises at least about 95% of the weight of the particles.

Finally, the particles are graphitized by heating in an inert environment up to at least 2200° C. and preferably up to at least 2500° C., and more preferably up to at least 2800° C. Typically, the graphitization temperature is not higher than 3200° C. Graphitizing creates the closely spaced sheets or planes of carbon crystals which accommodate the lithium ions there between. The graphite in the particle coating forms sheets that close the ends of the sheets or planes and substantially prevent the electrolyte from engaging in destructive side reactions with the long sheets or planes of the underlying particle. This is believed to be caused by the fixing of the carbon during the oxidative stabilization so that during graphitization, the coating is fixed and not able to follow or propagate along with the plane or sheet pattern of the underlying particle. Moreover, the graphitic coating provides electrical conductivity for electrons to move from the lithium ion to the anode foil and through the circuit outside the battery without the need for other additives to enhance conductivity.

As an optional aspect of the invention, the green coke may be provided with other suitable materials for use in an anode for a battery such as natural graphite, silicon, tin, or lithium titanite. The volatile matter in the green coke would be used to coat both the coke particles and all the ancillary substrate(s) in the solvent suspension. If an ancillary substrate such as silicon or tin is used, graphitization is eliminated as it would fuse and decompose the silicon, tin, or lithium titanite particles.

Figure 2:
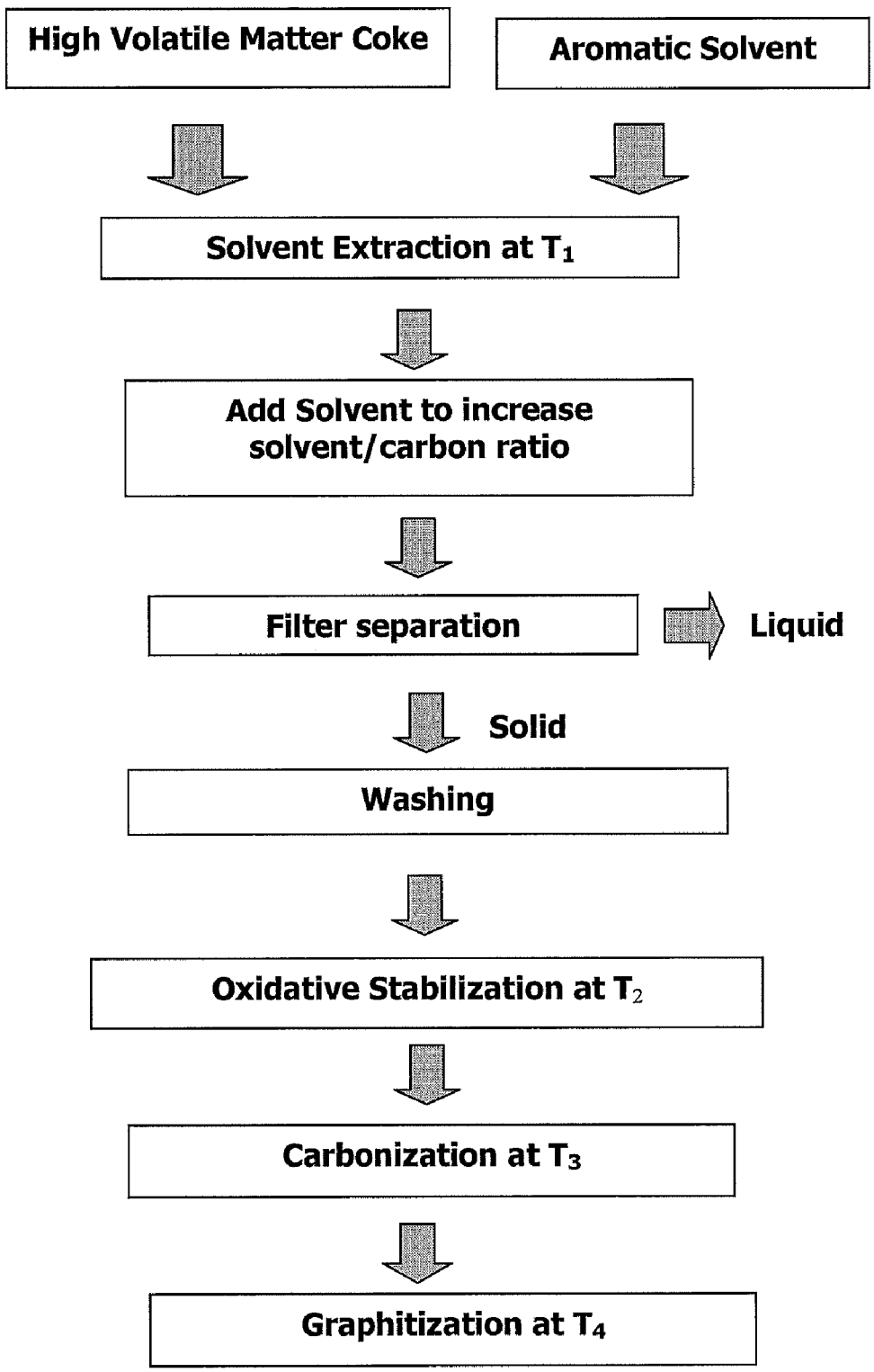
FIG. 2 is a process flow chart setting forth an alternative embodiment of the inventive process.

In a second embodiment, rather than add an anti-solvent, an additional amount of solvent is added to the suspension to increase the solvent-to-coke ratio so that the ratio is between at least 2:1 and up to about 20:1. FIG. 2 illustrates the second embodiment highlighting the increase in solvent ratio. While common sense would suggest that adding more solvent to the solvent suspension would cause more of the volatile matter to be extracted from the coke particles, the higher concentration actually decreases the solvent strength of the solvent causing the volatile matter to precipitate and thereby coat the particles in a manner similar to the coating by the primary method.

In both embodiments, the liquid solvent materials with whatever is dissolved therein are separated from the solids so that the pitch materials may be recovered and used for coating other particles in other processes. Sources for pitch materials for coating powders for use in batteries are limited and there are not a wide variety of suppliers. As such, the supply of low cost pitch is an issue for those that may use pitch to coat their materials. Extracting pitch from green coke in a process that concurrently produces useful anode battery powders provides an alternative source for pitch and is a win/win situation in that valuable products are made in the process of collecting precursors for other products.

The pitch may be separated from the solvent fluid or the solvent/anti-solvent blended fluids through known means such as distillation, wiped film evaporation, or other techniques. Moreover, the recoverable volatile materials may be treated or heat processed to alter isotropic pitches to increase the mesogen content.

Examples for disclosing the invention are provided. The first example is a control where the end product coke particles are not coated. The end product of the second example is a pitch-coated coke particle.

Example 1

A volume of 20 g of micronized green anode grade high volatile matter coke from the Rodeo Refinery having an average diameter of 16.6 µm was combined with 20 milliliters of toluene (1:1 solvent-to-pitch ratio) in a stainless steel Parr autoclave. The coke-toluene slurry was purged with nitrogen for 15 minutes, heated as a closed system under autogenous pressure to 280° C. while stirring and allowed to stir at 280° C. under pressure for 15 minutes.

Figure 3:
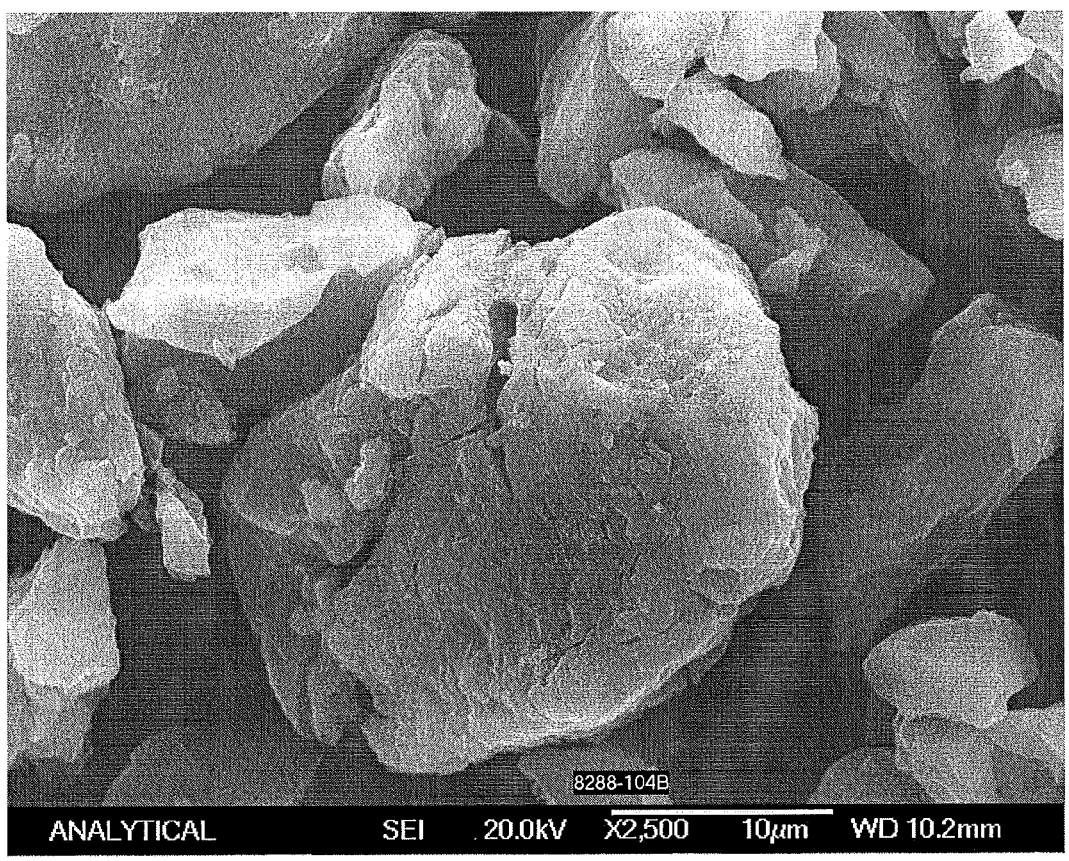
FIG. 3 is a scanning electron micrograph image of high volatile matter coke particles that have had the volatile matter solvent extracted.

After the reactor cooled to 140° C., 120 mls. of toluene "anti-solvent" was added to the vessel and the mixture was stirred an additional 15 minutes at 125° C. The vessel was allowed to cool to 24° C. and the pressure in the vessel was relieved. The coke-toluene slurry was filtered through a 0.45-µm fritted filter. The coke filter cake was then washed with ~100 mls. of xylene and allowed to dry under vacuum at 60° C. A volume of 18.5 g of dry coke was recovered. A scanning electron micrograph (SEM) of the dry coke is provided in FIG. 3. The lack of pitch coating on the surface of the particles is evident in the micrograph. The particles have sharp, well-defined edges, which is typical of uncoated, milled particles. The uncoated particles were then carbonized at 1000° C. for 1 hour and graphitized at 3000° C. for 45 minutes. The filtrate was rotary evaporated to remove the toluene and to recover the toluene-soluble pitch oils. A volume of 2 g of toluene-soluble pitch was obtained. After correcting for the amount of toluene in the pitch oils, the yield of toluene-soluble pitch was 9.95%. The boiling range of the pitch was found to be greater than 389° F. by simulated distilllation with 18% of the components boiling greater than 1328° F.

Example 2

Figure 4:
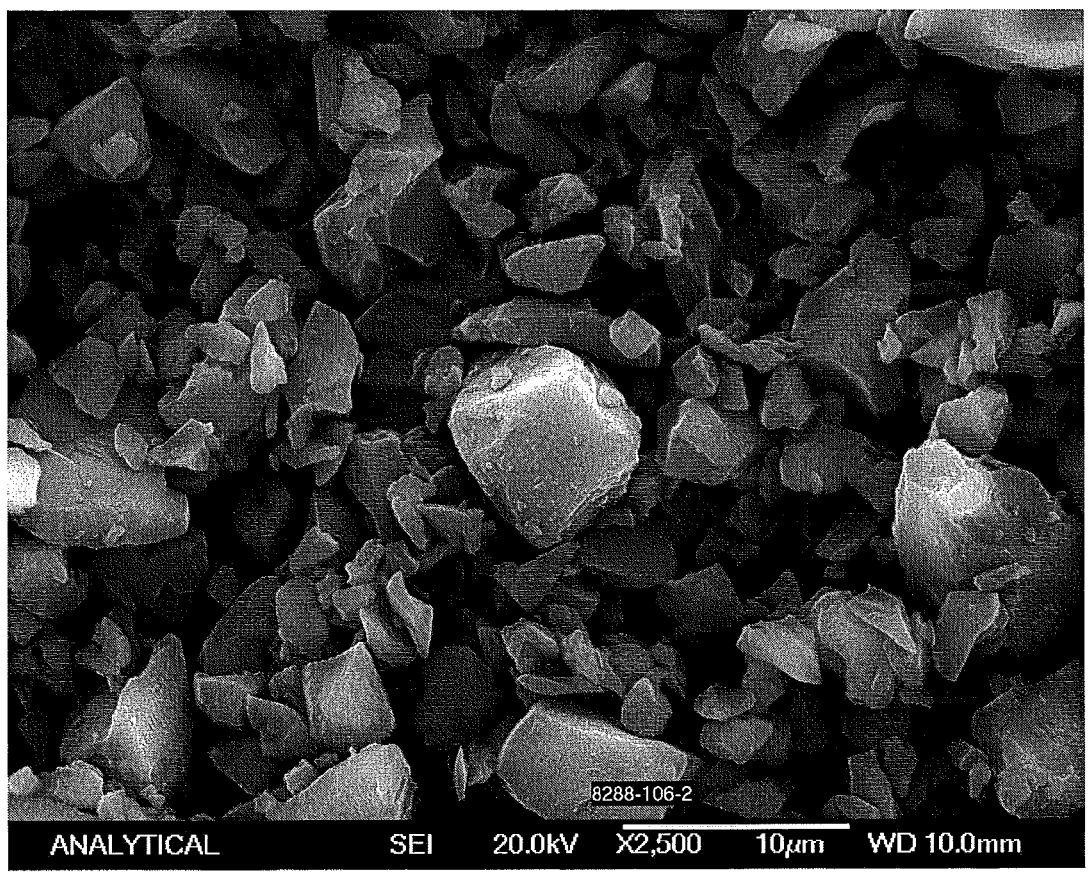
FIG. 4 is a scanning electron micrograph image of particles that are produced by the inventive process and specifically showing high volatile matter coke particles that have been coated with the volatile matter that has been in-situ extracted from the coke particles and then selectively coated thereon.

A volume of 30 grams of micronized green anode grade high volatile matter coke from the Rodeo Refinery having an average diameter of 6.13 µm was combined with 90 milliliters of toluene (3:1 solvent-to-pitch ratio) in a stainless steel Parr autoclave. The coke-toluene slurry was purged with nitrogen for 15 minutes, heated as a closed system under autogenous pressure to 280° C. while stirring and allowed to stir at 260° C. under pressure for 15 minutes. After the reactor cooled to 100° C., 100 mls. of 50/50 heptane/toluene was added to the vessel and the mixture was stirred an additional 15 minutes at 160° C. Heptane is an anti-solvent for toluene in this process. The vessel was allowed to cool to 30° C., the pressure in the vessel was relieved, and the coke-toluene slurry was filtered through a 0.45-µm fritted filter. The coke filter cake was then washed with ~100 mls. of 50/50 heptane/toluene mixed solvent and allowed to dry under vacuum at 60° C. A volume of 26.7 g of dry coke was recovered. A scanning electron micrograph (SEM) of the dry coke is illustrated in FIG. 2 below. The pitch coating on the surface of the particles is evident in the micrograph. Unlike the particles in FIG. 3 the particles in FIG. 4 have more rounded ill-defined edges due to coating of the plate-like particles. The coated particles were then carbonized at 1000° C. for 1 hour and graphitized at 3000° C. for 45 minutes. The solvent was found to have recoverable isotropic pitch. The graphitized particles were coated onto a copper sheet substrate and the graphite-coated copper was used as the anode in a lithium-ion coin cell (2025) for which lithium foil was used as the cathode material. The coin cell was tested for first cycle discharge capacity and first-cycle coulombic efficiency. The first-cycle discharge capacity was found to be 304 mA-h/g; and the first cycle coloumbic efficiency, 90%.

Finally, the scope of protection for this invention is not limited by the description set out above, but is only limited by the claims which follow. That scope of the invention is intended to include all equivalents of the subject matter of the claims. Each and every claim is incorporated into the specification as an embodiment of the present invention. Thus, the claims are part of the description and are a further description and are in addition to the preferred embodiments of the present invention. The discussion of any reference is not an admission that it is prior art to the present invention, especially any reference that may have a publication date after the priority date of this application.

The invention claimed is:

1. A process for making carbon coated graphitic anode powder for use in batteries wherein the process comprises:
    a) providing green coke having high volatile matter of at least about ten weight percent volatile matter;
    b) mixing the high volatile matter green coke with a liquid solvent at a selected solvent to carbon ratio to form a solvent suspension and also to extract volatile matter from the green coke, wherein the solvent is selected from the group consisting of toluene, benzene, and xylene;
    c) altering the solvent strength of the solvent suspension and cause volatile matter that has been extracted from the green coke to precipitate on the coke particles and form a coating thereon, wherein the altering the solvent strength comprises adding anti-solvent to the solvent suspension and the anti-solvent is selected from the group consisting of pentane, hexane, heptane, octane, and nonane;
    d) separating the solvent with residual dissolved volatile material from the coated green coke particles;
    e) stabilizing the coated green coke particles by oxidative stabilization while heating to a temperature of at least 200° C. in an oxygen containing environment;
    f) carbonizing the stabilized coated green coke particles to a temperature of at least 600° C. in an inert environment; and
    g) graphitizing the coated carbonized coke particles to a temperature of at least 2200° C.

2. The process for making carbon coated graphitic anode powder according to claim 1, further including the step of recovering dissolved volatile matter from the separated solvent liquid from step d).

3. The process for making carbon coated graphitic anode powder according to claim 1 wherein the step of oxidative stabilization is performed such that the temperature is progressively raised so that the coating remains infusible during the stabilization process until a desired temperature is attained for a predetermined period of time.

4. The process for making carbon coated graphitic anode powder according to claim 1 wherein the graphitization temperature is between 2500° C. and 3200° C.

5. The process for making carbon coated graphitic anode powder according to claim 1 wherein the carbonization temperature is between 600° C. and 1600° C.

* * * * *